United States Patent [19]

Pallini et al.

[11] Patent Number: 5,326,818
[45] Date of Patent: Jul. 5, 1994

[54] POLYSILOXANIC STABILIZERS CONTAINING STERICALLY HINDERED PHENOL GROUPS AND REACTIVE GROUPS

[75] Inventors: Luciano Pallini, San Donato Milanese; Daniele Fabbri, Riccione; Rossella Farris; Carlo Neri, both of San Donato Milanese, all of Italy

[73] Assignee: Eni Chem Synthesis S.p.A., Palermo, Italy

[21] Appl. No.: 160,619

[22] Filed: Dec. 2, 1993

Related U.S. Application Data

[62] Division of Ser. No. 944,061, Sep. 11, 1992, Pat. No. 5,292,850.

[51] Int. Cl.$^5$ .............................................. C08L 83/00
[52] U.S. Cl. .................................... 525/106; 525/103; 525/105; 525/446; 525/452
[58] Field of Search ...................... 528/32, 38, 41, 43; 525/106, 103, 105, 446, 452

Primary Examiner—Joseph L. Schofer
Assistant Examiner—Wu C. Cheng
Attorney, Agent, or Firm—Rogers & Wells

[57] ABSTRACT

Polymeric stabilizers with a polysiloxanic structure contain sterically hindered phenol groups and reactive groups capable of binding themselves to the polymeric structure to be stabilized. These polymeric stabilizers are particularly suitable for applications which require the non-extractability of additives due to solvents, fats or soaps.

20 Claims, No Drawings

POLYSILOXANIC STABILIZERS CONTAINING STERICALLY HINDERED PHENOL GROUPS AND REACTIVE GROUPS

This is a division of application Ser. No. 07/944,061, filed Sep. 11, 1992, now U.S. Pat. No. 5,292,850.

The present invention relates to the stabilization of organic polymers.

In particular it relates to a new group of polysiloxanic stabilizing additives containing sterically hindered phenol groups in the molecule, the procedure for the preparation of these stabilizing compounds and the stabilized polymeric compositions.

It is known that organic polymers are inclined to degrade over a period of time due to exposure to atmospheric agents, and that they are also easily subject to degradation during operating and transformation processes owing to the high temperatures reached.

This degradation is reflected in a decrease of the physical characteristics of the polymer, such as, for example, a decrease in the breaking load and in flexibility, and with alterations in the optical properties of the end product.

To counteract these forms of degradation it is common practice to introduce stabilizing compounds into the polymer. A group of compounds which is widely used for this purpose is that of sterically hindered phenols.

The problems which arise in the stabilization of organic polymers basically derive from incompatibility between polymer and stabilizer and the discharging of the stabilizer from the polymer. It is therefore necessary to have stabilizing compounds which are as compatible as possible with the polymer to be stabilized, and which are capable of remaining inside the polymer.

U.S. Pat. No. 4.888.375 and European Patent Application 182.415 describe sterically hindered phenolic antioxidant additives having a hydrolizable silicic function in the molecule.

These compounds, after hydrolysis of the sililated function, are capable of interacting among each other or with a solid support, producing complex resinous structures capable of remaining for a period of time inside the organic polymer in which they are incorporated.

In addition, stabilizing compounds of a polymeric nature, including sterically hindered phenol groups attached to the silicon atoms of a polysiloxanic chain are described, for example, in U.S. Pat. Nos. 4.430.235 and 4.879.378.

However, even if the incorporation of the stabilizer in a polymeric structure allows for its homogeneous mixing inside the polymeric materials to be stabilized, and this incorporation is capable of remaining inside the polymer for a period of time, there are certain particular cases when these stabilizers do not give sufficient guarantee for the uses for which they are destined.

This is the case, for example, when the end products are destined to come into contact with particular substances or solvents which are capable of extracting the stabilizing siloxanic polymer, or to come into contact with food when the total non-migration of the additive towards the surface of the product must be guaranteed.

A new group of stabilizers which overcomes the above disadvantages has now been surprisingly found.

The present invention consequently relates to a new group of stabilizing compounds of a polymeric nature composed of a polysiloxanic chain having, besides sterically hindered phenol groups, reactive organic groups capable of chemically binding themselves to the polymeric structure to be stabilized.

The present invention also relates to a process for the preparation of the above polymeric stabilizers.

Furthermore, the present invention relates to polymeric compositions containing an organic polymer and a stabilizing quantity of the above polymeric stabilizers.

In accordance with this, the first aspect of the present invention relates to polymeric stabilizing compounds having the following formula:

$$MX_mY_pZ_qM' \qquad (I)$$

wherein

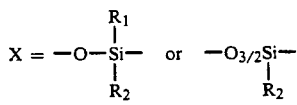

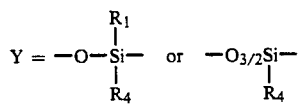

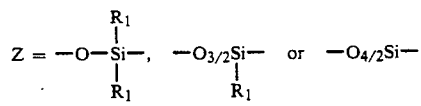

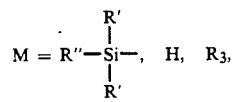

$M' = -OM$,

M and M' can optionally form together a direct bond thus producing a cyclic structure, $R_1$ is a phenyl or a linear or branched alkyl radical containing from 1 to 20 carbon atoms, $R_2$ is a reactive organic group capable of chemically binding itself to the polymeric structure to be stabilized, $R_3$ is a linear or branched alkyl radical containing from 1 to 6 carbon atoms, $R_4$ is a radical selected from the group including:

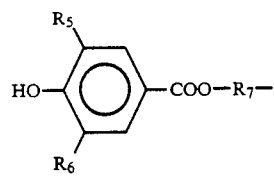

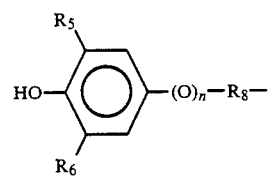

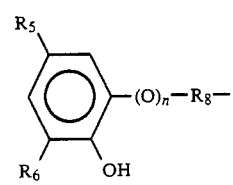

wherein, $R_5$ and $R_6$, the same or different, are alkyl radicals, linear or branched, containing from 1 to 10 carbon atoms, $R_7$ is an akylene radical, linear or branched, containing from 0 3 to 10 carbon atoms, $R_8$ is an alkylene radical, linear or branched, containing from 1 to 10 carbon atoms, or a biradical selected from $-R_9-COO-R_{10}-$, $-R_9-COO-R_{10}-S-R_{11}-$ and $-R_{10}-S-R_{11}-$, $R_9$, $R_{10}$ and $R_{11}$, the same or different, are alkylene radicals, linear or branched, containing from 2 to 10 carbon atoms, $R'$ is a phenyl or an alkyl radical, linear or branched, containing from 1 to 10 carbon atoms, $R''$ is equal to $R'$, $R_2$ or $R_4$, m, p, the same or different are integers from 1 to 50, q is an integer between 0 and 50, n is equal to 0 or 1.

$R_2$ is preferably selected from radicals containing a carbon-carbon double bond, an epoxy ring, a sulphide group, or an aminic group.

More preferably, $R_2$ is a radical selected from the group including:

$$CH_2=CH-$$

$$CH_2=\overset{CH_3}{\underset{|}{C}}-COO(CH_2)_3-$$

$$\overset{O}{\overset{/\ \backslash}{CH_2-CH}}-CH_2-O-(CH_2)_3-$$

$$HS-(CH_2)_3-$$
$$H_2N-(CH_2)_3-$$

$$O\underset{}{\overbrace{\bigcirc}}\overset{CH_2-CH_2-}{}$$

When $R_1$ is an alkyl radical, it preferably contains from 1 to 10 carbon atoms, and even more preferably from 1 to 3 carbon atoms. Particularly preferred is the case where $R_1$ is methyl.

$R_5$ and $R_6$ are preferably branched, and even more preferably are t-butyl radicals.

The stabilizing compounds of the present invention are polymers having a random distribution of monomeric units X, Y and Z.

They may also have hydroxyl and/or alkoxyl groups on the silicon atoms which are not shown in the general formulae given.

The compounds corresponding to general formula (I) can be obtained, for example, by the reaction of a mixture of compounds having the following formulae:

$$\underset{R_2}{\overset{(R_1)_n}{\underset{|}{Si}-(R''')_{3-n}}}$$ (II)

$$\underset{R_4}{\overset{(R_1)_n}{\underset{|}{Si}-(R''')_{3-n}}}$$ (III)

optionally in the presence of compounds having the following formulae:

$$\overset{(R_1)_r}{\underset{|}{Si}-(R''')_{4-r}}$$ (IV)

$$R''-\underset{R'}{\overset{R'}{\underset{|}{Si}}}-R'''$$ (V)

wherein $R'''$ is $OR_3$ or Cl, r is equal to 0, 1 or 2 and $R_1$, $R_2$, $R_4$, $R'$, $R''$, and n have the meaning previously defined.

The compounds having formula (II), (III), (IV) and (V) hydrolize under bland conditions generating silanols which can be condensed among each other to form polysiloxanic structures which are more or less complex depending on the number of $R'''$ groups linked to the silicon atom.

By suitably varying the ratios between the compounds having formula (II), (III), (IV) and (V) which are reacted, it is possible to vary the m, p, q values in the compounds having formula (I) obtained.

In particular, depending on the quantities used of a compound having formula (V), which acts as chain terminator, products can be obtained with structures more or less complex and with higher or lower molecular weights.

The above hydrolysis and copolymerization reaction is carried out in water or in a mixture of organic solvent and water in ratios of up to 10:1.

When in the reagents having formula (II), (III), (IV) and (V), $R'''$ is equal to $OR_3$, the process is carried out at a temperature ranging from 20° to 100° C. for a period of 2-20 hours, until the complete hydrolysis of the reagents. At this stage the polymerization reaction is carried out at the boiling point of the solvent, in the presence of a condensation catalyst, eliminating the reaction water and alcohol by distillation. The reaction is then continued at reduced pressure (0.1-50 mm Hg) at temperatures ranging from 60° to 140° C. The polymerization reaction generally requires a period of 2 to 10 hours.

When, on the other hand, $R'''$ is equal to Cl, the reaction is carried out under stirring at temperatures ranging from 20° to 120° C. for a period of 1-5 hours. The product recovered from the organic phase after eliminating the solvent by distillation at reduced pressure.

Commercial products such as vinylmethyldichlorosilane, vinyltriethoxysilane, 3-mercaptopropyltrimethoxysilane, 3-glycidyloxyproyltrimethoxysilane, 3-methacryloxypropyltrichlorosilane, 3-aminopropyltriethoxysilane, may be used as reagents having formula (II).

With respect to the reagents having formula (III), these can be synthesized, for example, as described in U.S. Pat. No. 4,888,375 in the name of same Applicant.

Examples of alkoxysilanic compounds having formula (III) are those having the following formulae:

$$HO-\underset{t}{\overset{t}{\underset{}{\bigcirc}}}-(CH_2)_2COO(CH_2)_3Si\overset{OCH_2CH_3}{\underset{OCH_2CH_3}{-CH_3}}$$

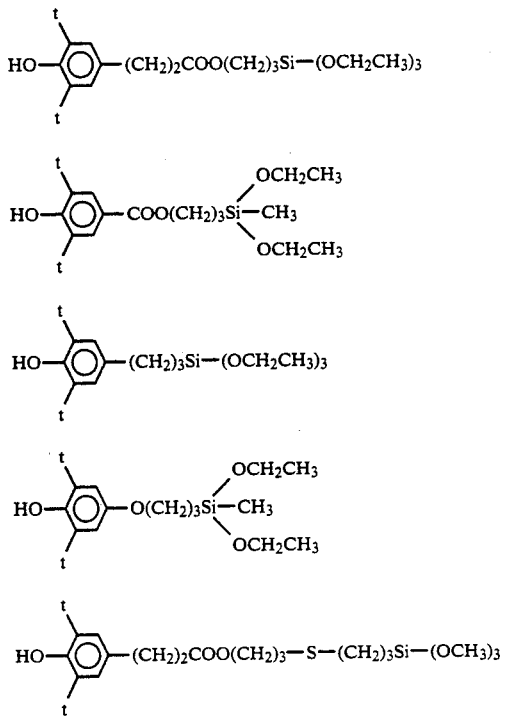

wherein t is a ter-butyl radical.

Commercial products such as dimethyldichlorosilane, diphenyldichlorosilane, dimethyldiethoxysilane can be used as reagents having formula (IV).

Commercial products such as trimethylchlorosilane, trimethylethoxysilane, vinyldimethylethoxysilane may be used as reagents having formula (V).

The organic solvent is selected from the group including ethers, such as tetrahydrofuran (THF), alcohols such as ethanol, aliphatic hydrocarbons, such as heptane, allcyclic hydrocarbons, such as cyclohexane, or aromatic hydrocarbons, such as toluene.

Condensation catalysts which can be used are, for example, dibutyltindilaurate, zinc octanoate, tin octanoate or an alkaline hydroxide. The concentration of the catalyst is within the range of 0,005–0.5% by weight with respect to the reagents charged.

The polymeric additives of the present invention are characterized in that they have a reactive function which is capable of linking to the polymeric matrix or to the reinforcing material of the plastic product or to the charges, thus preventing the stabilizer from being discharged from the matrix or improving the adhesion between matrix and support.

As said before, these characteristics, together with the capacity of delaying the degradation of the polymers, are particularly important when the non-migration of the additive and its non-extractability with solvents, fats or soaps are required.

This is the case, for example, when polymeric end products are destined to come in contact with food, or in the stabilization of polymeric mixtures or copolymers, or also for 0 the production of composite end products composed of multilayers of organic polymers or polymer and inorganic support.

In this latter case, in fact, the migration of the additive almost always causes a detachment of the various layers, a loss of mechanical characteristics of the product and a more rapid degradation of the organic material.

The siliconic products of the present invention are generally added to the organic polymer to be stabilized in the compounding phase.

More generally the stabilizers of the present invention are added as additives either in the final phase of the synthesis process or in the production phase of the end-products.

The most widely used method is to add the products in the preparatory phase of the end-product because it allows for the level of addition to correspond to the characteristics of the product to be obtained.

The polymers to be stabilized can be polyolefins (LDPE, LLDPE, HDPE, PP) and their copolymers, the copolymers of these with acrylic acid or maleic anhydride, polyesters, polyamides, polycarbonates, polyurethanes, terpolymers EPDM and ABS, synthetic rubbers.

One of the applications of this technology is the production of products made of low density polyethylene (LDPE) cross-linked during the extrusion phase.

When the additive of the present invention has $R_2$ groups containing a double reactive bond or a sulphide group, the grafting of the additive to the polymeric matrix takes places owing to the formation of radicals, and can possibly be induced by the presence of small quantities of organic peroxide during the operating phase of the polymeric material at high temperatures.

The stabilizers of the present invention may additionally contain one or more additives selected, for example, from antioxidants, heat and light stabilizers, metal disactivators, basic co-stabilizers and nucleating agents.

In particular, they can be used in combination with additives based on sterically hindered amines, such as those corresponding to the trade-names Uvasil 299, Tinuvin 770, Tinuvin 622, Chimassorb 944, or phosphites and/or phosphonites such as those corresponding to the trade-names Ultranox 626, Weston 618, Alkanox 240, Sandostab PEPQ, or organic compounds containing sulphur such as distearyl thiodipropionate and dilauryl thiodipropionate.

The quantity of siliconic additive normally used varies from 0.05% to 1% by weight of the weight of the resin to be stabilized. The preferred quantities vary from 0.1% to 0.8% by weight of the weight of the resin.

The following examples provide a better illustration of the present invention but do not limit it in any way.

EXAMPLE 1

Preparation of a Stabilizer Corresponding to the Following Formula

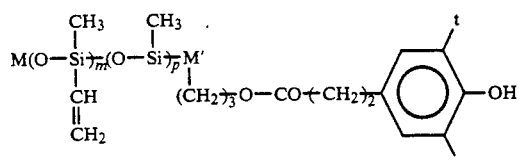

wherein M is H or $CH_3CH_2-$, M' is OH or $CH_3CH_2O-$ and t is terbutyl.

25.0 ml of ethanol, 11.1 g (0,025 moles) of a compound having formula (III) wherein $R_1$ is methyl, $R_3$ is ethyl and $R_4$ is

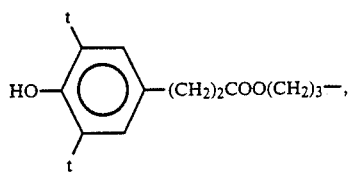

1.0 ml of diethoxy methylvinylsilane and 5.0 ml of H₂O are charged into a flask equipped with a stirrer, condenser and thermometer.

The solution is kept at 65° C. until gas chromatograhic analysis no longer reveals the presence of the reagents, i.e. for about 3 hours.

The ethanol is then removed by distillation, 0.05 ml of dibutyltindilaurate are added and the mixture is brought to a temperature of 120° C. at reduced pressure (5–12 mm Hg) for a period of 3 hours.

A colourless resinous product is obtained, having an average osmometric molecular weight of 1300 Da, and whose IR and NMR spectra are consistent with the structure indicated, with a ratio m/p=0.2.

EXAMPLE 2

Preparation of a Stabilizer Corresponding to the Following Formula

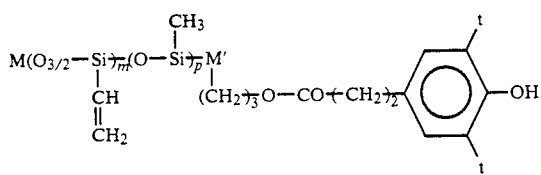

wherein M is H or CH₃CH₂—, M' is OH or CH₃CH₂O— and t is terbutyl.

20.0 ml of ethanol, 11.91 g (0,026 moles) of a compound having formula (III) wherein R₁ is methyl, R₃ is ethyl and R₄ is

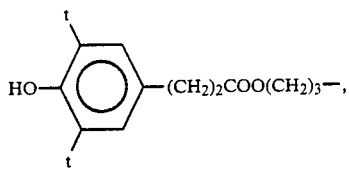

0.50 g (0.0026 moles) of triethoxyvinylsilane and 3.0 ml of H₂O are charged into a flask equipped with stirrer, condenser and thermometer.

The solution is kept at 55° C. until gaschromatographic analysis no longer reveals the presence of the reagents, i.e. for about 5 hours. It is then left overnight at room temperature.

The ethanol is then removed by distillation, 0.04 ml of dibutyltindilaurate are added and the mixture is brought to a temperature of 100 to 130° C. at reduced pressure (up to 0.4 mm Hg) for a period of 3 hours.

9.87 g of a resinous product are obtained, whose IR and NMR spectra are consistent with the structure indicated, with a ratio m/p=0.1.

EXAMPLE 3

Preparation of the Same Stabilizer as Example 2

The same procedure is used as described in Example 2, but charging 9.85 g of the compound having formula (III) and 1.10 g of triethoxyvinylsilane.

8.36 g of a resinous product are obtained, whose structure corresponds to that of the product of Example 2, with a ratio m/p=0.2.

EXAMPLE 4

Preparation of the Same Stabilizer as Example 2

The same procedure is used as described in Example 2, but charging 11.67 g of the compound having formula (III) and 4.93 g of triethoxyvinylsilane.

11.70 g of a resinous product are obtained, whose structure corresponds to that of the product of Example 2, with a ratio m/p=1.0.

COMPARATIVE EXAMPLE A

Preparation of a Stabilizer Corresponding to the Following Formula

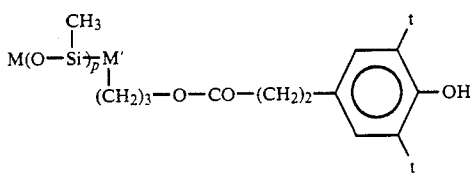

wherein M is H or CH₃CH₂—, M' is OH or CH₃CH₂O— and t is terbutyl.

20.0 ml of ethanol, 5.0 ml of H₂O and 9.42 g of a compound having formula (III) wherein R₁, is methyl, R₃ is ethyl and R₄ is

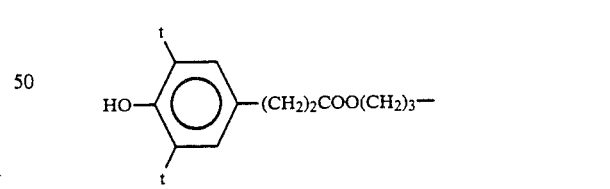

are charged into a flask equipped with a stirrer, condenser and thermometer.

The solution is kept at 60° C. for about 2 hours. The ethanol is then removed by distillation, 0.02 ml of dibutyltindilaurate are added and the temperature is brought to 120° C. at reduced pressure (4 mm Hg) for a period of 3 hours.

8.21 g of a colourless resinous product are obtained, having an average osmometric molecular weight of about 1800 Da.

EXAMPLE 5

Preparation of a Stabilizer Corresponding to the Following Formula

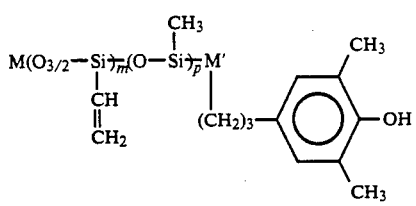

wherein M is H or CH$_3$CH$_2$—, and M' is OH or CH$_3$CH$_2$O—.

20.0 ml of ethanol, 6.0 g (0.020 moles) of a compound having formula (III) wherein R$_1$ is methyl, R$_3$ is ethyl and R$_4$ is

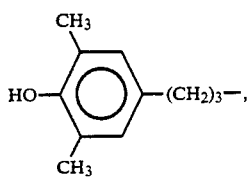

3.8 g (0.2 moles) of triethoxy vinylsilane and 3.0 ml of H$_2$O are charged into a flask equipped with a stirrer, condenser. and thermometer.

The solution is kept at room temperature until gas-chromatographic analysis no longer reveals the presence of the reagents, i.e. for about 20 hours.

0.05 ml of dibutyltindilaurate are then added and the ethanol is slowly removed (4 hours) by distillation. The temperature is brought to 120° C. at reduced pressure (up to 5 mm Hg) for a period of 3 hours.

6.53 g of a resinous product are obtained, having an average osmometric molecular weight of 2500 Da, whose NMR spectrum is consistent with the structure indicated, with a ratio m/p=1.0.

EXAMPLE 6

Preparation of a Stabilizer Corresponding to the Following Formula

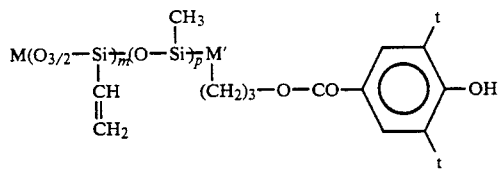

wherein M is H or CH$_3$CH$_2$—, M' is OH or CH$_3$CH$_2$O— and t is ter-butyl.

20.0 ml of ethanol, 5.60 g (0.013 moles) of a compound having formula (III) wherein R$_1$ is methyl, R$_3$ is ethyl and R$_4$

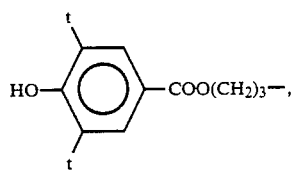

2.47 g (0.013 moles) of triethoxyvinylsilane and 3.0 ml of H$_2$O are charged into a flask equipped with a stirrer, condenser and thermometer.

The same procedure is used as described in Example 2. 6.86 g of a glass which can be broken into a solid white product, are obtained, whose IR and NMR spectra are consistent with the structure indicated, with a ratio m/p=1.0.

EXAMPLE 7

Preparation of a Stabilizer Corresponding to the Following Formula

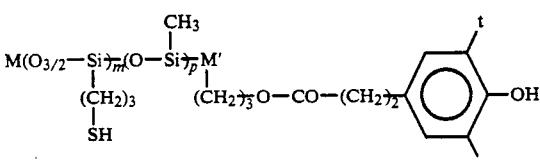

wherein M is H or CH$_3$CH$_2$—, M' is OH or CH$_3$CH$_2$O— and t is ter-butyl. 20.0 ml of ethanol, 7.98 g (0,017 moles) of a compound having formula (III) wherein R$_1$ is methyl, R$_3$ is ethyl and R$_4$ is

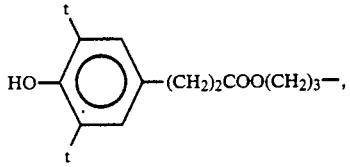

3.5 ml (0.017 moles) of 3-mercaptopropyltrimethoxysilane and 4.0 ml of H$_2$ are charged into a flask equipped with a stirrer, condenser and thermometer.

The solution is kept at room temperature until gas-chromatographic analysis no longer reveals the presence of the reagents, i.e. for about 10 hours.

The ethanol is then removed by distillation, and 50 ml of toluene and 0.02 ml of dibutyltindilaurate are added. The temperature is brought to 110° C. for a period of 3 hours while the water is azeotropically eliminated. The toluene is then removed by distillation and the residue is treated for 1 hour at 120° C. under vacuum.

9.35 g of a resinous product is obtained whose IR and NMR spectra are consistent with the structure indicated, with a ratio m/p=1.0.

EXAMPLE 8

Preparation of LDPE Stabilized with the Compounds of the Invention

Masters of commercial LDPE of the Riblene CF 2200 type with 10% by weight of stabilizer were prepared with the stabilizing compounds prepared as described in Examples 1,2,3,4 according to the following procedure.

The stabilizing compound is dissolved in toluene; LDPE in powder form is added to this solution, and the solvent is then removed by evaporation at reduced pressure under stirring.

The masters thus prepared are mixed with further commercial LDPE of the Riblene CF 2200 type to obtain mixtures containing 0.2% by weight of stabilizer.

Each of these mixtures, to which 2,5-dimethyl-2,5-di(terbutylperoxy)hexane up to 0,015% by weight has been added, is extruded in a Brabender laboratory-type extruder with 50 rpm of the screw, and with the following temperature profile from the head zone to the tail zone: 155-160-170-170° C.

The samples thus extruded are cut into pellets and pressed for 3 minutes at 200° C., to obtain sample plates having a thickness of 0.5 mm.

Using the same procedure but without peroxide, LDPE sample plates were prepared to which the compound of Comparative Example A, ANOX 20 or ANOX PP18 were added. The two latter products are commercial additives containing the sterically hindered phenol group.

The sample plates thus prepared were extracted in soxhlet with acetone for 10 hours and with 1,2-dichloroethane for 7 hours.

The relative quantity of antioxidant remaining after the extraction treatment is evaluated on a first series of sample plates by IR measurements. The relative absorption variation is calculated at 1735 cm$^{-1}$ compared with a non-stabilized sample (TO), and the remaining percentage of antioxidant is expressed as:

$$RE = A/A_0 \times 100$$

where RE is the extraction resistance and $A_0$ and A are the absorption values respectively before and after the extraction treatment. The results are shown in Table 1.

To verify the stabilization of the test samples after the extraction treatment, a second series of sample plates was submitted to prolonged thermal treatment in an oven with air circulation at 100° C. The degradation process was observed on the basis of the formation of carbonylic compounds revealed by IR measurements. In particular, the index value of carbonyl ($I_{co}$) is calculated, expressed as:

$$I_{co} = A_{1710cm^{-1}}/A_{1885cm^{-1}}$$

The induction time is determined from the $I_{co}$ values. A greater effectiveness of the stabilizing action corresponds to a high value of the induction time. The induction times of the non-extracted ($TI_0$) and extracted (TI) test samples are shown in Table II.

TABLE I

| SAMPLE | m/p | RE |
|---|---|---|
| Example 1 | 0.2 | 63 |
| Example 2 | 0.1 | 70 |
| Example 3 | 0.2 | 77 |
| Example 4 | 1.0 | 93 |
| Example A (comparison) | 0 | 50 |
| ANOX 20 | / | 10 |
| ANOX PP18 | / | 0 |

TABLE II

| SAMPLE | m/p | $TI_0$ (h) | TI (h) |
|---|---|---|---|
| TQ | / | 10 | 10 |
| Example 1 | 0.2 | 1650 | 920 |
| Example 2 | 0.1 | 1100 | 680 |
| Example 3 | 0.2 | 750 | 640 |
| Example 4 | 1.0 | 630 | 500 |
| Example A (comparison) | 0 | 1500 | 550 |
| ANOX 20 | / | 1300 | 130 |
| ANOX PP18 | / | 1700 | 10 |

We claim:

1. A polymeric composition comprising an organic polymer and a stabilizing quantity of a polymeric stabilizer having a formula:

$$MX_mY_pZ_qM'$$

wherein

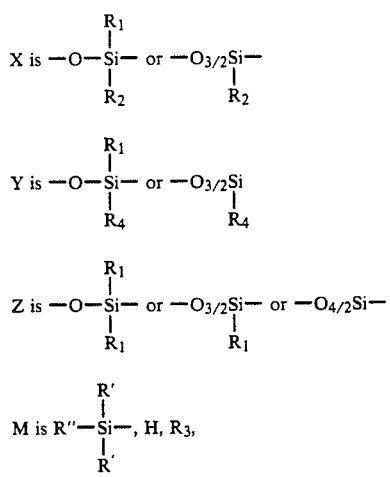

$$M \text{ is } R''-\underset{\underset{R'}{|}}{\overset{\overset{R'}{|}}{Si}}-, H, R_3,$$

M' is —OM,

M and M' can optionally form together a direct bond thus producing a cyclic structure, $R_1$ is a phenyl or a linear or branched alkyl radical containing from 1 to 20 carbon atoms, $R_2$ is a reactive organic group which contains a carbon-carbon double bond, an epoxy ring, a sulfide group, or an aminic group, $R_3$ is a linear or branched alkyl radical containing from 1 to 6 carbon atoms, $R_4$ is a radical selected from the group consisting of

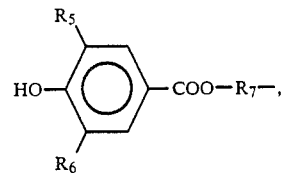

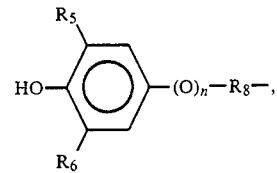

and

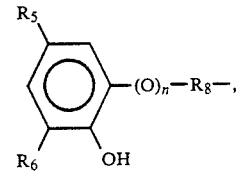

wherein, $R_5$ and $R_6$, which may be the same or different, are linear or branched alkyl radicals which contain from 1 to 10 carbon atoms, $R_7$ is a linear or branched alkylene radical which contains from 3 to 10 carbon atoms, $R_8$ is a linear or branched alkylene radical which contains from 1 to 10 carbon atoms or a biradical selected from the group consisting of —R$_9$—COO—R$_{10}$, —R$_9$—COO—R$_{11}$—, R$_9$, R$_{10}$ and R$_{11}$, which may be the same or different, are linear or branched alkylene radicals which contain from 2 to 10 carbon atoms, R' is a phenyl or a linear or branched alkyl radical which contains from 1 to 10 carbon atoms, R" is the same as R', R$_2$ or R$_4$, m and p, which may be the same or different, are integers from 1 to 50, and q is an integer between 0 and 50, n is equal to 0 or 1.

2. A polymeric composition according to claim 1, wherein the organic polymer is selected from the group consisting of LDPE, LLDPE, and HDPE.

3. A polymeric composition according to claim 1, wherein, in the polymeric stabilizer, R$_1$ is a methyl, R$_2$ is CH$_2$=CH—, CH$_2$=C(CH$_3$)—COO—(CH$_2$)$_3$— or HS—(CH$_2$)$_3$, and R$_4$ is a radical having the formula:

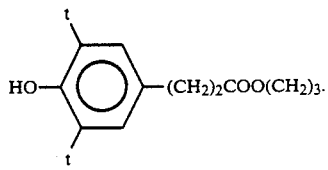

4. A polymeric composition according to claim 2, wherein, in the polymeric stabilizer, R$_1$ is a methyl, R$_2$ is CH$_2$=CH—, CH$_2$=C(CH$_3$)—COO—(CH$_2$)$_3$— or HS—(CH$_2$)$_3$, and R$_4$ is a radical having the formula:

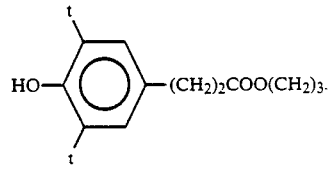

5. A polymeric composition according to claim 1, wherein, in the polymeric stabilizer, R is a linear or branched C$_1$-C$_{10}$ alkyl radical.

6. A polymeric composition according to claim 2, wherein, in the polymeric stabilizer, R is a linear or branched C$_1$-C$_{10}$ alkyl radical.

7. A polymeric composition according to claim 5, wherein R$_1$ is a linear or branched C$_1$-C$_3$ alkyl radical.

8. A polymeric composition according to claim 6, wherein R$_1$ is a linear or branched C$_1$-C$_3$ alkyl radical.

9. A polymeric composition according to claim 7, wherein R$_1$ is a methyl radical.

10. A polymeric composition according to claim 8, wherein R$_1$ is the methyl radical.

11. A polymeric composition according to claim 1, wherein R$_5$ and R$_6$ are branched.

12. A polymeric composition according to claim 2, wherein R$_5$ and R$_6$ are branched.

13. A polymeric composition according to claim 11, wherein R$_5$ and R$_6$ are t-butyl radicals.

14. A polymeric composition according to claim 2, wherein R$_5$ and R$_6$ are t-butyl radicals.

15. A polymeric composition according to claim 1, wherein R$_1$ is a linear or a branched C$_1$-C$_{10}$ alkyl radical and wherein R$_5$ and R$_6$ are branched.

16. A polymeric composition according to claim 2, wherein R$_1$ is a linear or a branched C$_1$-C$_{10}$ alkyl radical and wherein R$_5$ and R$_6$ are branched.

17. A polymeric composition according to claim 1, wherein R$_1$ is methyl and R$_5$ and R$_6$ are t-butyl radicals.

18. A polymeric composition according to claim 2, wherein R$_1$ is methyl and R$_5$ and R$_6$ are t-butyl radicals.

19. A polymeric composition according to claim 1, wherein, in the polymeric stabilizer, R$_1$ is a linear or a branched C$_1$-C$_{10}$ alkyl radical; wherein R$_2$ is

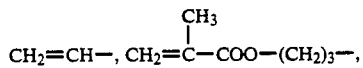

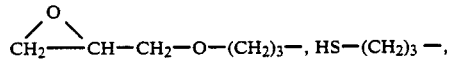

or

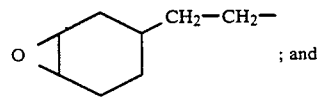

wherein R$_5$ and R$_6$ are branched.

20. A polymeric composition according to claim 2, wherein, the polymeric stabilizer, R$_1$ is a linear or a branched alkyl radical containing from 1 to 10 carbon atoms; wherein R$_2$ is

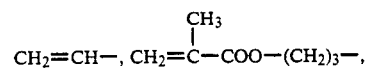

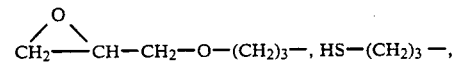

or

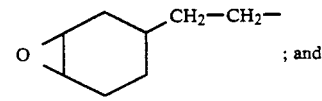

wherein R$_5$ and R$_6$ are branched.

* * * * *